(12) United States Patent
Katsuta

(10) Patent No.: US 8,875,487 B2
(45) Date of Patent: Nov. 4, 2014

(54) EXHAUST PURIFYING SYSTEM FOR HYBRID VEHICLE AND CONTROL METHOD THEREFOR

(75) Inventor: Hiroshi Katsuta, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 20 days.

(21) Appl. No.: 13/522,912

(22) PCT Filed: Feb. 16, 2011

(86) PCT No.: PCT/JP2011/053220
§ 371 (c)(1),
(2), (4) Date: Jul. 18, 2012

(87) PCT Pub. No.: WO2012/111102
PCT Pub. Date: Aug. 23, 2012

(65) Prior Publication Data
US 2013/0008148 A1 Jan. 10, 2013

(51) Int. Cl.
| | |
|---|---|
| *F01N 3/00* | (2006.01) |
| *B60W 10/26* | (2006.01) |
| *F01N 3/20* | (2006.01) |
| *B60W 20/00* | (2006.01) |

(52) U.S. Cl.
CPC ............... *B60W 10/26* (2013.01); *Y02T 10/26* (2013.01); *F01N 3/2013* (2013.01); *B60Y 2300/474* (2013.01); *B60W 20/1082* (2013.01)
USPC ............. 60/277; 60/274; 60/280; 60/284; 60/286; 180/65.21; 180/65.26; 180/65.28; 180/309

(58) Field of Classification Search
CPC ................... F01N 2250/22; F01N 2290/0602
USPC ........... 60/274, 277, 280, 284, 286, 300, 303; 180/65.1, 65.21, 65.25, 65.26, 65.27, 180/65.28, 309
See application file for complete search history.

(56) References Cited

U.S. PATENT DOCUMENTS

| | | | | |
|---|---|---|---|---|
| 5,390,493 | A | * | 2/1995 | Fujishita et al. ................. 60/284 |
| 5,456,063 | A | * | 10/1995 | Yoshizaki et al. .............. 60/284 |
| 5,746,053 | A | | 5/1998 | Hibino |

(Continued)

FOREIGN PATENT DOCUMENTS

| | | |
|---|---|---|
| EP | 0973239 B1 | 12/2001 |
| JP | 6-17697 A | 1/1994 |

(Continued)

*Primary Examiner* — Binh Q Tran
(74) *Attorney, Agent, or Firm* — Sughrue Mion, PLLC

(57) ABSTRACT

An exhaust purifying system includes: a catalytic device supplied with electric power from a power supply unit; a first connecting unit connecting one end of the catalytic device to a negative electrode node of the power supply unit; a second connecting unit connecting the other end of the catalytic device to a positive electrode node of the power supply unit; a leak detecting unit detecting leak from the power supply unit; and a control unit controlling opening and closing of each of the first and second connecting units. When leak is not detected by the leak detecting unit in a leak check state where one of the first and second connecting units is closed and the other is opened, the control unit closes the other and applies current through the catalytic device, and when leak is detected in the leak check state, the control unit does not apply the current through the catalytic device.

6 Claims, 5 Drawing Sheets

(56) References Cited

U.S. PATENT DOCUMENTS

| | | | | |
|---|---|---|---|---|
| 5,785,138 | A * | 7/1998 | Yoshida | 180/65.245 |
| 7,007,464 | B1 * | 3/2006 | Asami et al. | 60/300 |
| 7,284,365 | B2 * | 10/2007 | Abe | 60/277 |
| 8,215,424 | B2 * | 7/2012 | Kaita | 180/65.265 |
| 8,438,836 | B2 * | 5/2013 | Watanabe et al. | 60/277 |
| 2009/0277705 | A1 | 11/2009 | Ichikawa | |
| 2012/0004801 | A1 | 1/2012 | Watanabe | |

FOREIGN PATENT DOCUMENTS

| | | | |
|---|---|---|---|
| JP | 9-158717 A | 6/1997 | |
| JP | 2002-021541 A | 1/2002 | |
| JP | 2003-278528 A | 10/2003 | |
| JP | 2004-183501 A | 7/2004 | |
| JP | 2007187454 A | 7/2007 | |
| JP | 2009-274471 A | 11/2009 | |
| JP | 2010-223159 A | 10/2010 | |
| WO | WO 2010/109304 A1 * | 9/2010 | 60/286 |

\* cited by examiner

EXHAUST PURIFYING SYSTEM FOR HYBRID VEHICLE AND CONTROL METHOD THEREFOR

CROSS REFERENCE TO RELATED APPLICATION

This application is a National Stage International Application No. PCT/JP2011/053220 filed Feb. 16, 2011, the contents of all of which are incorporated herein by reference in their entirety.

TECHNICAL FIELD

The present invention relates to an exhaust purifying system for a hybrid vehicle and a control method therefor, and particularly to an exhaust purifying system for a hybrid vehicle including a catalytic device supplied with electric power and heated, and a control method therefor.

BACKGROUND ART

Generally, in a vehicle having an internal combustion engine mounted thereon, a catalytic device is provided to purify exhaust gas. Since this catalytic device does not produce any effect unless the temperature rises to some extent, the catalytic device is arranged close to the internal combustion engine such that the temperature rises immediately.

The purification effect is not perfect, however, immediately after startup of the internal combustion engine, that is, when the catalytic device has not yet been warmed. In addition, in a hybrid vehicle capable of running using only a motor, the internal combustion engine is operated as necessary. The catalytic device, however, is not always warmed by exhaust gas at the time of startup of the internal combustion engine. Therefore, warming the catalytic device in advance using electric power before startup of the internal combustion engine is under consideration. Such a catalytic device is called "Electrical Heated Catalyst" (hereinafter also referred to as "EHC"). The EHC generates heat by passing current through the catalytic device itself. Japanese Patent Laying-Open No. 2010-223159 (PTL 1) discloses a technique of preventing leak at the time of passing current through an EHC and suppressing deterioration in emission in a vehicle having the EHC mounted thereon. According to this technique, in a plug-in hybrid vehicle, an ECU first executes low-voltage driving of restraining driving voltage to 50 V when requesting passage of the current through the EHC, and detects the existence of occurrence of the leak caused by dew condensation of condensate in the EHC based on a resistance value of the EHC. As a result, when it is determined that the leak is occurring, passage of the current through the EHC is prohibited. On the other hand, when it is determined that the leak is not occurring, the driving voltage is boosted to 200 V in ordinary driving, and catalytic warming-up by the EHC is executed.

CITATION LIST

Patent Literature

PTL 1: Japanese Patent Laying-Open No. 2010-223159
PTL 2: Japanese Patent Laying-Open No. 2002-21541
PTL 3: Japanese Patent Laying-Open No. 2003-278528
PTL 4: Japanese Patent Laying-Open No. 6-17697

SUMMARY OF INVENTION

Technical Problem

According to the above technique, upon sensing the leak and the like when a high-voltage power supply and the EHC are connected with an EHC driving device interposed therebetween, passage of the current through the EHC is interrupted. Therefore, there is a possibility that the high-voltage power supply is not protected sufficiently. Detection of the leak in the EHC has room for improvement in terms of protection of the high-voltage power supply.

An object of the present invention is to provide an exhaust purifying system for a hybrid vehicle in which greater protection is provided to a high-voltage power supply when leak occurs, and a control method therefor.

Solution to Problem

In summary, the present invention is directed to an exhaust purifying system for a hybrid vehicle including a power supply unit, a motor receiving electric power from the power supply unit, and an internal combustion engine used with the motor, the exhaust purifying system including: a catalytic device supplied with electric power from the power supply unit and heated; a first connecting unit connecting one end of the catalytic device to a negative electrode node of the power supply unit; a second connecting unit connecting the other end of the catalytic device to a positive electrode node of the power supply unit; a leak detecting unit detecting leak from the power supply unit; and a control unit controlling opening and closing of each of the first connecting unit and the second connecting unit. When leak is not detected by the leak detecting unit in a leak check state where one of the first connecting unit and the second connecting unit is closed and the other is opened, the control unit closes the other and applies current through the catalytic device, and when leak is detected in the leak check state, the control unit does not apply the current through the catalytic device.

Preferably, the control unit controls the first connecting unit and the second connecting unit such that the first connecting unit is closed and the second connecting unit is opened in the leak check state.

Preferably, the leak detecting unit detects both leak from the power supply unit and leak from the catalytic device.

Preferably, the leak detecting unit detects leak from the power supply unit with the first connecting unit and the second connecting unit open, and thereafter, the first connecting unit and the second connecting unit are controlled such that the first connecting unit is closed and the second connecting unit is opened in the leak check state, and the leak detecting unit detects leak from the catalytic device.

According to another aspect, the present invention is directed to a hybrid vehicle including any one of the above-mentioned exhaust purifying systems.

According to still another aspect, the present invention is directed to a control method for an exhaust purifying system for a hybrid vehicle including a power supply unit including a power storage device, a motor driven by the power supply unit, and an internal combustion engine used with the motor. The exhaust purifying system includes: a catalytic device supplied with electric power from the power supply unit and heated; a first connecting unit connecting one end of the catalytic device to a negative electrode node of the power supply unit; a second connecting unit connecting the other end of the catalytic device to a positive electrode node of the power supply unit; a leak detecting unit detecting leak from the power supply unit; and a control unit controlling opening and closing of each of the first connecting unit and the second connecting unit. The control method includes the steps of: setting the exhaust purifying system to a leak check state where one of the first connecting unit and the second connecting unit is closed and the other is opened; detecting leak by the leak detecting unit; and controlling the first connecting unit and the second connecting unit to close the other and apply current through the catalytic device when leak is not detected in the step of detecting leak, and not to apply the current through the catalytic device when leak is detected.

Advantageous Effects of Invention

According to the present invention, there is provided an exhaust purifying system for a hybrid vehicle in which greater protection is provided to a high-voltage power supply when leak occurs, and a control method therefor.

DESCRIPTION OF EMBODIMENTS

Figure 1:
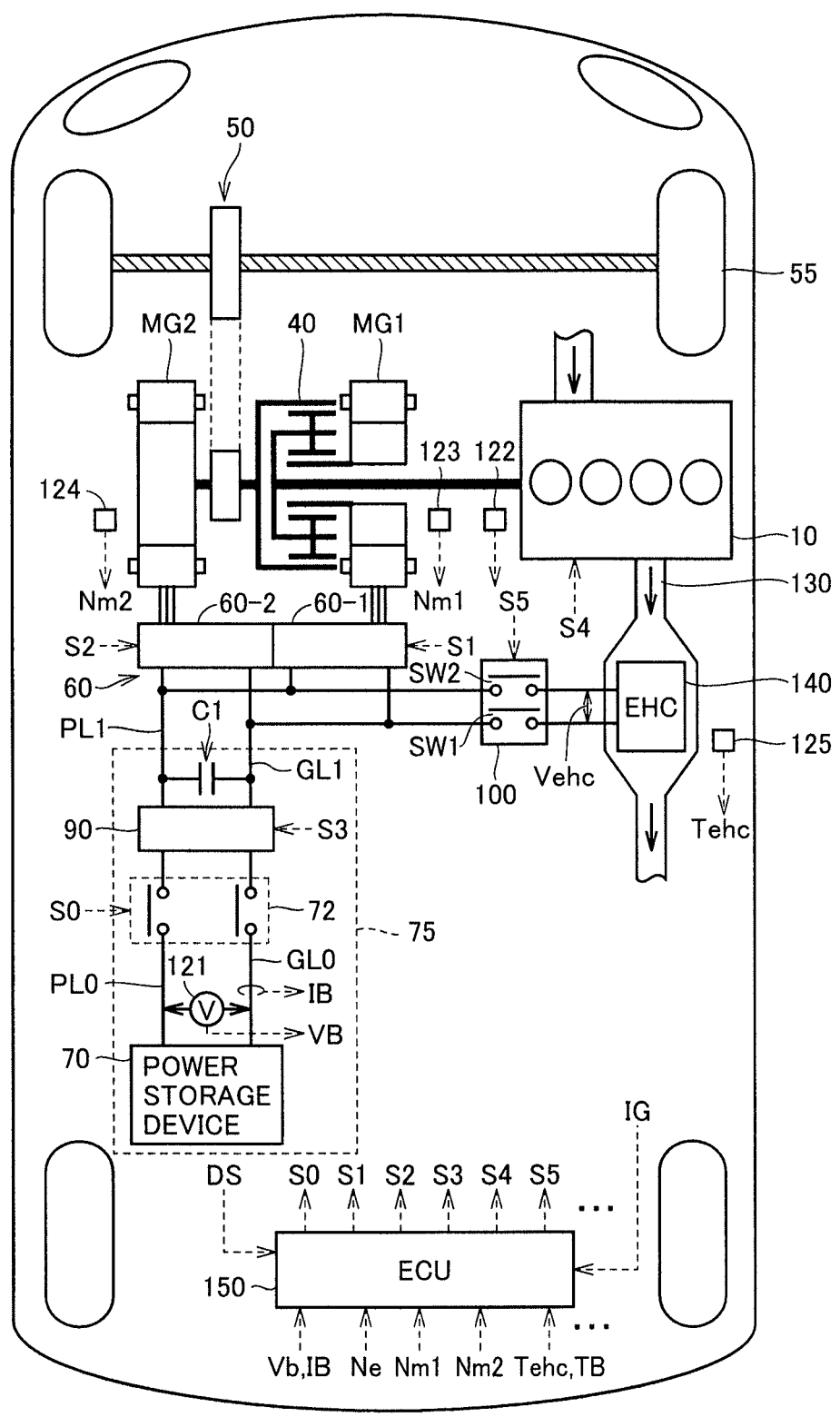
FIG. 1 is an overall block diagram of a hybrid vehicle to which an exhaust purifying system according to an embodiment of the present invention is applied.

An embodiment of the present invention will be described in detail hereinafter with reference to the drawings, in which the same or corresponding portions are denoted with the same reference characters and a description thereof will not be repeated.

FIG. 1 is an overall block diagram of a hybrid vehicle to which an exhaust purifying system according to an embodiment of the present invention is applied.

Referring to FIG. 1, a hybrid vehicle 1 includes an engine 10, a motor generator MG1, a motor generator MG2, a power split device 40, a decelerator 50, and a driving wheel 55.

Engine 10 is an internal combustion engine generating driving force for rotating a crankshaft by combustion energy generated during combustion of an air-fuel mixture taken into a combustion chamber. Motor generator MG1 and motor generator MG2 are AC motors, and are three-phase AC synchronous motors, for example.

Hybrid vehicle 1 runs using the driving force outputted from at least one of engine 10 and motor generator MG2. The driving force generated by engine 10 is split by power split device 40 into two paths, that is, the path through which the driving force is transmitted to driving wheel 55 via decelerator 50, and the path through which the driving force is transmitted to motor generator MG1.

Power split device 40 includes a planetary gear formed of a sun gear, a pinion gear, a carrier, and a ring gear. The pinion gear engages with the sun gear and the ring gear. The carrier supports the pinion gear to allow rotation on its axis, and is coupled to the crankshaft of engine 10. The sun gear is coupled to a rotation shaft of motor generator MG1. The ring gear is coupled to a rotation shaft of motor generator MG2 and decelerator 50.

Engine 10, motor generator MG1 and motor generator MG2 are coupled with power split device 40 interposed thereamong, and thereby rotation speeds of engine 10, motor generator MG1 and motor generator MG2 have such a relationship that they are linearly connected with one another in a collinear chart.

Hybrid vehicle 1 further includes an inverter 60 and a power supply unit 75. Power supply unit 75 includes a smoothing capacitor C1, a voltage converter 90, a system main relay 72, and a power storage device 70.

Inverter 60 controls driving of motor generator MG1 and motor generator MG2. Motor generator MG1 generates electric power using motive power of engine 10 split by power split device 40. The electric power generated by motor generator MG1 is converted from AC to DC by inverter 60 and is stored in power storage device 70.

Motor generator MG2 generates driving force using at least one of the electric power stored in power storage device 70 and the electric power generated by motor generator MG1. The driving force of motor generator MG2 is transmitted to driving wheel 55 via decelerator 50. Although driving wheel 55 is shown as a front wheel in FIG. 1, a rear wheel may be driven by motor generator MG2 instead of or together with the front wheel.

It is to be noted that at the time of braking the vehicle and the like, motor generator MG2 is driven by driving wheel 55 via decelerator 50 and operates as a generator. As a result, motor generator MG2 also functions as a regenerative brake converting kinetic energy of the vehicle to electric power. The electric power generated by motor generator MG2 is stored in power storage device 70.

A secondary battery such as a lead storage battery, a nickel-metal hydride battery and a lithium ion battery, a large-capacitance capacitor such as an electrical double layer capacitor, or the like can be used, for example, as power storage device 70.

Inverter 60 includes an inverter 60-1 and an inverter 60-2. Inverter 60-1 and inverter 60-2 are connected to voltage converter 90 in parallel with each other.

Inverter 60-1 is provided between voltage converter 90 and motor generator MG1. Inverter 60-1 controls driving of motor generator MG1 based on a control signal S1 from an electronic control unit (hereinafter referred to as "ECU") 150.

Inverter 60-2 is provided between voltage converter 90 and motor generator MG2. Inverter 60-2 controls driving of motor generator MG2 based on a control signal S2 from ECU 150.

Voltage converter 90 makes a voltage conversion between power storage device 70 and inverter 60. Voltage converter 90 boosts a voltage of power storage device 70 (more precisely, a voltage between a positive electrode line PL0 and a negative electrode line GL0) to a target voltage value indicated by a control signal S3 from ECU 150, and outputs the boosted voltage to inverter 60. As a result, a voltage between a positive electrode line PL1 and negative electrode line GL1 (hereinafter also referred to as "high-voltage-side DC voltage VH" or simply as "voltage VH") is controlled to attain the target voltage value indicated by control signal S3.

Smoothing capacitor C1 is connected between positive electrode line PL1 and a negative electrode line GL1. It is to be noted that negative electrode line GL1 and negative electrode line GL0 are connected inside voltage converter 90. Smoothing capacitor C1 smoothes high-voltage-side DC voltage VH.

Hybrid vehicle 1 further includes a current sensor 120, a voltage sensor 121, rotation speed sensors 122, 123 and 124, and a temperature sensor 125.

Voltage sensor 121 measures a voltage VB across terminals of power storage device 70. Current sensor 120 senses a current IB flowing to power storage device 70, in order to monitor a state of charge (SOC) of power storage device 70 together with voltage sensor 121.

Rotation speed sensors 122, 123 and 124 detect a rotation speed Ne of engine 10, a rotation speed Nm1 of motor generator MG1, and a rotation speed Nm2 of motor generator MG2, respectively. Temperature sensor 125 detects a temperature Tehc of an EHC 140. Each of these sensors transmits a result of detection to ECU 150.

ECU 150 has a not-shown CPU (Central Processing Unit) and a not-shown memory built therein, and is configured to execute predetermined operation processing based on a map and a program stored in the memory. Alternatively, at least a part of ECU 150 may be configured to execute predetermined numerical and logical operation processing using hardware such as an electronic circuit.

ECU 150 generates above-mentioned control signals S0 to S4 based on information from each sensor and the like, and outputs generated control signals S0 to S4 to each device. For example, ECU 150 sets a torque command value Tgcom of motor generator MG1 and a torque command value Tmcom of motor generator MG2 based on the information from each sensor and the like, generates control signal S1 for matching torque Tg of motor generator MG1 with torque command value Tgcom as well as control signal S2 for matching torque Tm of motor generator MG2 with torque command value Tmcom, and outputs control signal S1 and control signal S2 to inverter 60-1 and inverter 60-2, respectively. In addition, ECU 150 sets a command value of an amount of fuel injected by engine 10, based on the information from each sensor and the like, generates control signal S4 for matching the actual amount of fuel injected by engine 10 with the command value, and outputs control signal S4 to engine 10.

In addition, ECU 150 also controls passage of current through electrical heated catalyst (EHC) 140 based on a control signal S5. Exhaust gas discharged from engine 10 is discharged through an exhaust passage 130 to the air. EHC 140 is provided in exhaust passage 130.

EHC 140 is configured to be capable of electrically heating a catalyst for purifying the exhaust gas. EHC 140 is connected to power storage device 70 with a junction box 100, voltage converter 90 and system main relay 72 interposed therebetween, and heats the catalyst using supplied electric power. Since the catalyst provided in EHC 140 is heated, the purification performance is enhanced. It is to be noted that various known EHCs can be applied as EHC 140.

ON/OFF of system main relay 72 can be switched based on control signal S0. Junction box 100 can switch whether or not to supply electric power to EHC 140, based on control signal S5. As described later with reference to FIG. 3, junction box 100 is configured to be capable of controlling connection to positive electrode line PL1 and connection to negative electrode line GL1 independently, using relays SW1 and SW2. It is to be noted that a source of power to EHC 140 may be positive electrode line PL0 and negative electrode line GL0, instead of positive electrode line PL1 and negative electrode line GL1.

Figure 2:
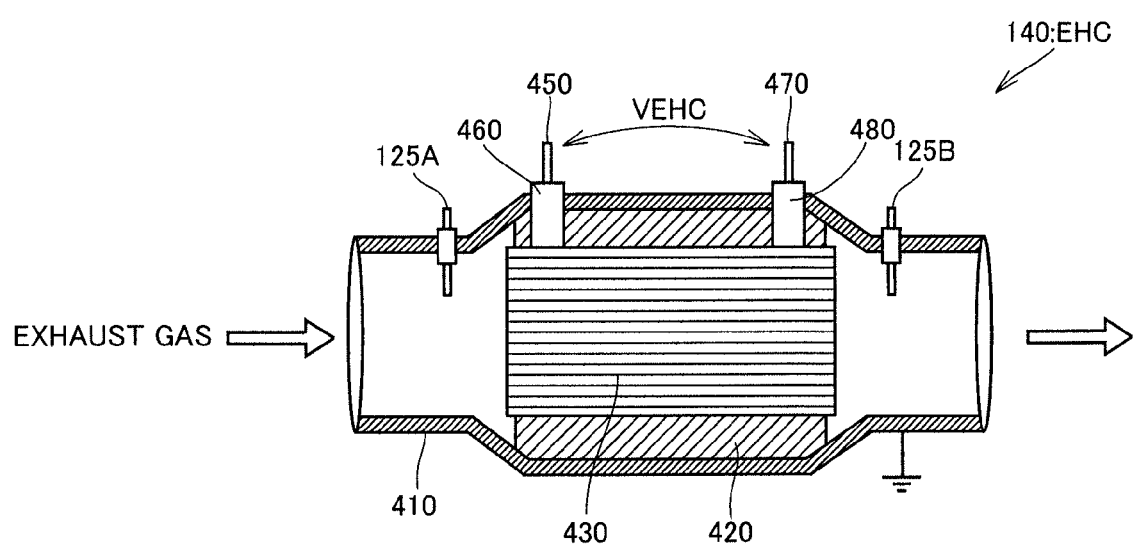
FIG. 2 is a cross-sectional view showing a schematic configuration of an EHC 140 taken along a direction in which an exhaust pipe in FIG. 1 extends.

FIG. 2 is a cross-sectional view showing a schematic configuration of EHC 140 taken along a direction in which an exhaust pipe in FIG. 1 extends.

Referring to FIG. 2, EHC 140 is configured to include a case 410, an insulating member 420, an EHC carrier 430, temperature sensors 125A and 125B, a positive electrode 450, a positive electrode coating unit 460, a negative electrode 470, and a negative electrode coating unit 480. EHC 140 is one example of an electrical heated catalytic device.

Case 410 is a housing for EHC 140 made of a metallic material such as, for example, stainless, and is connected to exhaust passage 130 in FIG. 1 by coupling members (not shown) at ends of case 410 on the upstream and downstream sides.

Insulating member 420 is placed to cover an inner circumferential surface of case 410, and has the heat insulation property and the electrical insulation property. An insulating material such as, for example, alumina is used as insulating member 420.

EHC carrier 430 is a conductive catalyst carrier whose cross section orthogonal to the exhaust direction forms a honeycomb structure. It is to be noted that the carrier refers to a substance serving as a base for fixing (carrying) a substance exhibiting adsorption and catalytic activity. EHC carrier 430 carries a not-shown oxidized catalyst and is configured to be capable of purifying as appropriate the exhaust gas passing through EHC carrier 430. It is to be noted that the catalyst carried by EHC carrier 430 may be a three-way catalyst.

Positive electrode 450 is an electrode for applying a positive voltage, which has one end fixed to a portion near an end on the exhaust upstream side of EHC carrier 430. The other end of positive electrode 450 is connected to relay SW2 in FIG. 1. It is to be noted that a part of positive electrode 450 is covered with positive electrode coating unit 460 made of a resin and having the electrical insulation property to keep the electrical insulation state between case 410 and positive electrode 450.

Upstream temperature sensor 125A is a sensor arranged in the exhaust pipe upstream of EHC carrier 430 and configured to be capable of detecting a temperature of a portion near EHC carrier 430. Upstream temperature sensor 125A is electrically connected to ECU 150 in FIG. 1, and the detected temperature is referred to by ECU 150 at a constant or inconstant cycle.

Negative electrode 470 is an electrode for supplying a reference potential, which has one end fixed to a portion near an end on the exhaust downstream side of EHC carrier 430. The other end of negative electrode 470 is connected to relay SW1 in FIG. 1. It is to be noted that a part of negative electrode 470 is covered with negative electrode coating unit 480 made of a resin and having the electrical insulation property to keep the electrical insulation state between case 410 and negative electrode 470.

Downstream temperature sensor 125B is a sensor arranged in the exhaust pipe downstream of EHC carrier 430 and configured to be capable of detecting a temperature of a portion near EHC carrier 430. Downstream temperature sensor 125B is electrically connected to ECU 150, and the detected temperature is referred to by ECU 150 at a constant or inconstant cycle.

In EHC 140 having the above-mentioned configuration, when the positive voltage is applied to positive electrode 450 with respect to the potential of negative electrode 470, current flows through conductive EHC carrier 430 and EHC carrier 430 generates heat. This heat generation promotes a rise in the temperature of the oxidized catalyst carried by EHC carrier 430, and EHC 140 moves to the catalytically active state quickly.

It is to be noted that the above-mentioned configuration of EHC 140 is merely one example. The configuration of the EHC carrier, arrangement of each electrode, the manner of control and the like, for example, may have various known manners.

In order to sufficiently maintain the heat capacity of EHC 140, a material having a relatively large electrical resistance (e.g., ceramics) is used as EHC carrier 430.

A DC driving voltage Vehc is supplied between positive electrode 450 and negative electrode 470. A driving current Iehc corresponding to this DC driving voltage Vehc is generated in EHC carrier 430, and EHC carrier 430 generates heat in accordance with the amount of heat generated based on this driving current Iehc and an electrical resistance Rehc of EHC carrier 430.

Figure 3:
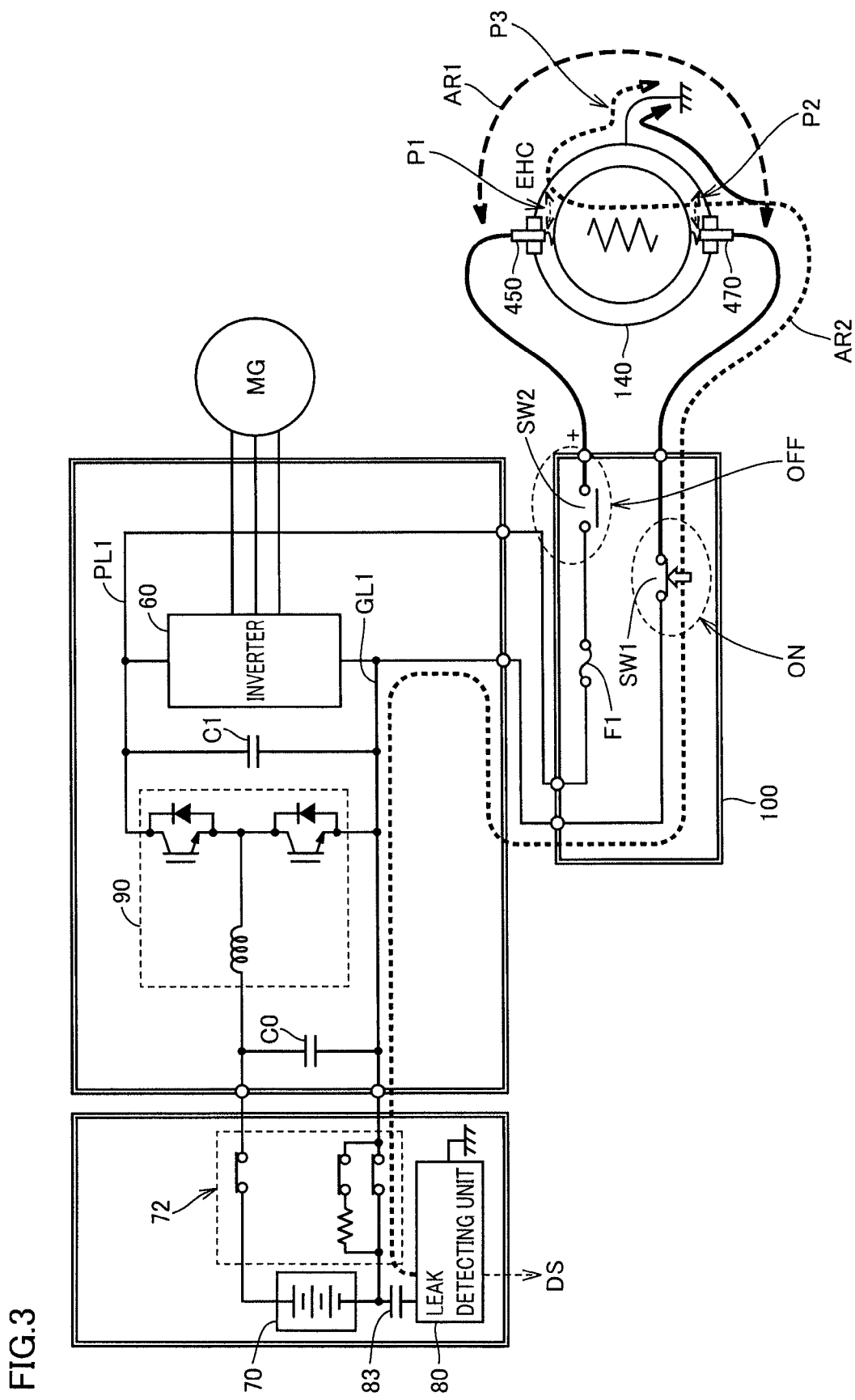
FIG. 3 is a diagram for describing occurrence of leak in the EHC and a short circuit in a high-voltage power supply.

FIG. 3 is a diagram for describing occurrence of leak in the EHC and a short circuit in the high-voltage power supply.

Referring to FIG. 3, a capacitor 83 and a leak detecting unit 80 are serially connected between a negative electrode of power storage device 70 and a ground node (body earth).

Junction box 100 includes relay SW2 connecting positive electrode line PL1 to positive electrode 450 of EHC 140, relay SW1 connecting negative electrode line GL1 to negative electrode 470 of EHC 140, and a fuse F1 serially connected to relay SW2.

Assume that leak occurs at a point P1 in EHC 140, leak also occurs at a point P2, and connection to the body earth is provided at a point P3. At this time, if both relay SW1 and relay SW2 are connected simultaneously, a short circuit occurs in positive electrode line PL1 and negative electrode line GL1 due to the case without passing through a resistor of EHC 140. Then, excessive current may flow through power storage device 70, and thus, power storage device 70 must be protected. In addition, since the case is connected to the body earth, the high voltage of power storage device 70 may be applied to the body earth as well.

Provision of another leak detecting unit in the EHC 140 portion separately from leak detecting unit 80, however, leads to an increase in circuits, which causes an increase in vehicle manufacturing cost.

Thus, in the exhaust purifying system according to the present embodiment, leak detecting unit 80 carries out leak detection with relay SW1 closed and relay SW2 opened. When leak detection is carried out in this state, current never flows from power storage device 70 because the high voltage is not applied to positive electrode 450. In other words, even when leak occurs at both points P1 and P2, a current path from the positive electrode to the negative electrode of power storage device 70 is not formed because relay SW2 is open, and thus, current never flows from power storage device 70. In addition, since leak detecting unit 80 can also detect leak occurring in EHC 140, it is not necessary to provide a new leak detecting unit.

Figure 4:
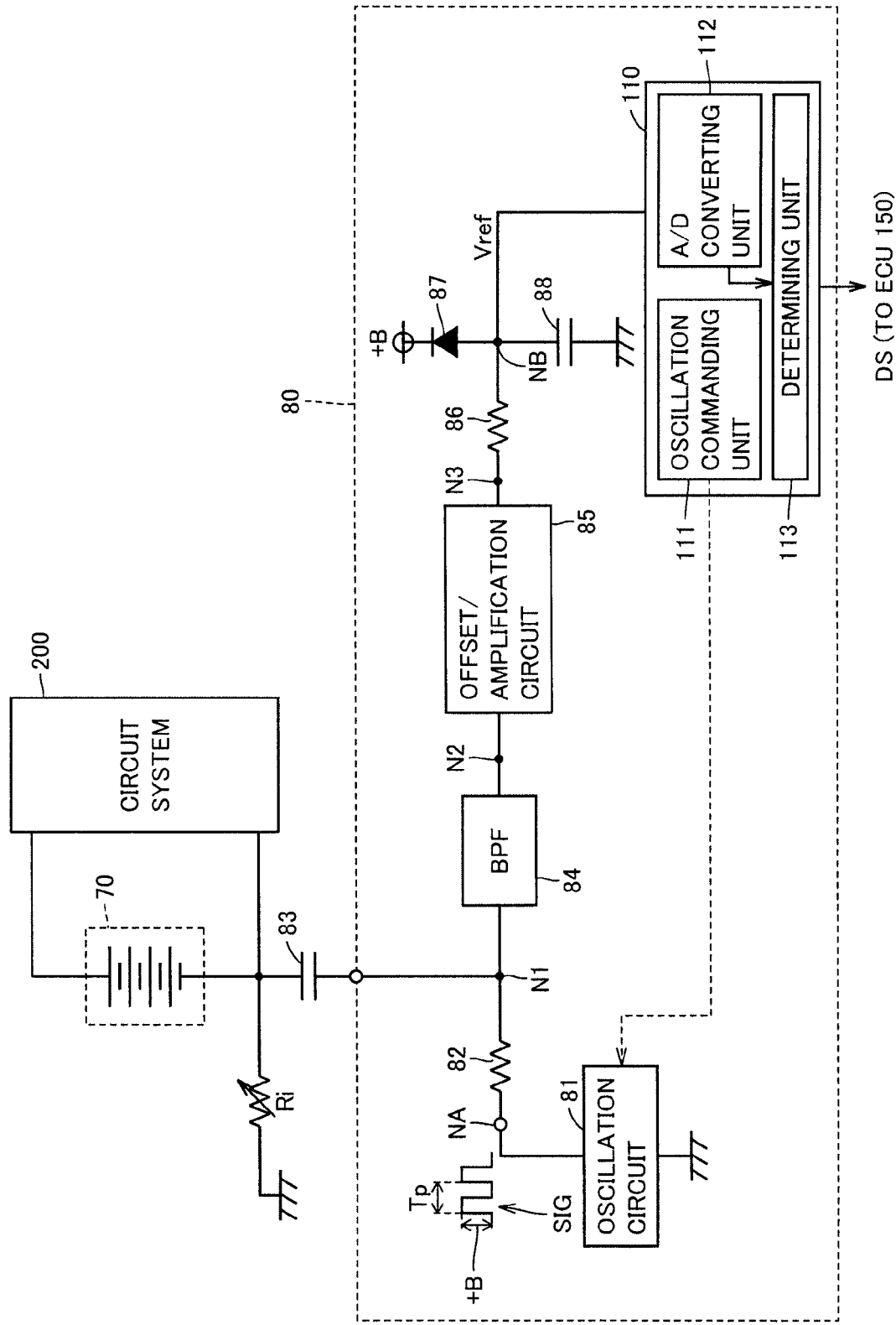
FIG. 4 is a circuit diagram showing a configuration of a leak detecting unit 80 in FIG. 3.

FIG. 4 is a circuit diagram showing a configuration of leak detecting unit 80 in FIG. 3.

Referring to FIG. 4, a circuit system 200 indicates the vehicle system shown in FIG. 1 by one functional block. In addition, a ground node shown in FIG. 4 corresponds to the body earth (vehicle body) in the vehicle.

Leak detecting unit 80 includes an oscillation circuit 81 serving as a signal generating unit, a detection resistance 82, a bandpass filter (BPF) 84, a circuit block 85 formed of an offset circuit and an amplification circuit, an overvoltage protection diode 87, a resistance 86, a capacitor 88, and a control circuit 110.

Oscillation circuit 81 applies a pulse signal SIG changing at a predetermined frequency (predetermined cycle Tp) to a node NA. Detection resistance 82 is connected between node NA and a node N1. A coupling capacitor 83 is connected between node N1 and power storage device 70 subjected to leak detection. Bandpass filter 84 has an input terminal connected to node N1 and an output terminal connected to a node N2. The passband frequency of bandpass filter 84 is designed to correspond to the frequency of pulse signal SIG.

Circuit block 85 is connected between node N2 and a node N3. Circuit block 85 amplifies a voltage change near a threshold voltage set at the time of detecting an insulation resistance, of the pulse signal that has passed through bandpass filter 84. Overvoltage protection diode 87 has a cathode connected to a constant voltage node and an anode connected to a node NB, and removes a surge voltage (high voltage or negative voltage). Resistance 86 is connected between node N3 and node NB. Capacitor 88 is connected between node NB and the ground node. Resistance 86 and capacitor 88 function as a filter removing noise of a signal outputted from circuit block 85.

Control circuit 110 controls oscillation circuit 81. In addition, control circuit 110 detects a voltage at node NB and detects a decrease in an insulation resistance Ri based on the detected voltage. Control circuit 110 includes an oscillation commanding unit 111, an A/D converting unit 112 and a determining unit 113.

Oscillation commanding unit 111 provides an instruction to generate pulse signal SIG to oscillation circuit 81, and provides an instruction to change the duty ratio of pulse signal SIG. A/D converting unit 112 makes an A/D conversion of the voltage (detected voltage) at node NB detected at a predetermined sampling cycle Ts. Since sampling cycle Ts is sufficiently shorter than cycle Tp of pulse signal SIG, the maximum voltage (peak voltage Vp) and the minimum voltage at node NB can be detected. Determining unit 113 compares a value of peak voltage Vp obtained from A/D converting unit 112 with a threshold value. As a result, control circuit 110 detects whether insulation resistance Ri decreases or not.

Next, an operation for detecting the decrease in insulation resistance Ri will be described. Pulse signal SIG generated by oscillation circuit 81 is applied to a series circuit configured to include detection resistance 82, coupling capacitor 83, insulation resistance Ri, and bandpass filter 84. As a result, at node N1 corresponding to a point connecting detection resistance 82 and coupling capacitor 83, a pulse voltage is generated, which takes, as a crest value, a value related to a product of a voltage division ratio of insulation resistance Ri and detection resistance 82 (resistance value Rd): Ri/(Rd+Ri) and an amplitude of pulse signal SIG (voltage that is a power supply voltage+B). It is to be noted that voltage+B may be, for example, a voltage of an auxiliary battery, although voltage+B is not limited thereto.

As for the pulse voltage generated at node N1, the components other than the frequency of pulse signal SIG is attenuated by bandpass filter 84. Only voltage change near the threshold voltage, of pulse signal SIG that has passed through bandpass filter 84, is amplified by circuit block 85. The signal outputted from circuit block 85 is transmitted to node NB. When the signal is transmitted from node N3 to node NB, the surge voltage is removed by overvoltage protection diode 87 and the noise is removed by resistance 86 and capacitor 88.

When insulation resistance Ri is normal, Ri>>Rd. As Ri becomes higher, peak voltage Vp becomes almost equal to voltage+B. On the other hand, when insulation resistance Ri decreases, voltage division ratio: Ri/(Rd+Ri) decreases, and thus, peak voltage Vp decreases. Detection of the decrease in peak voltage Vp allows detection of occurrence of leak.

Figure 5:
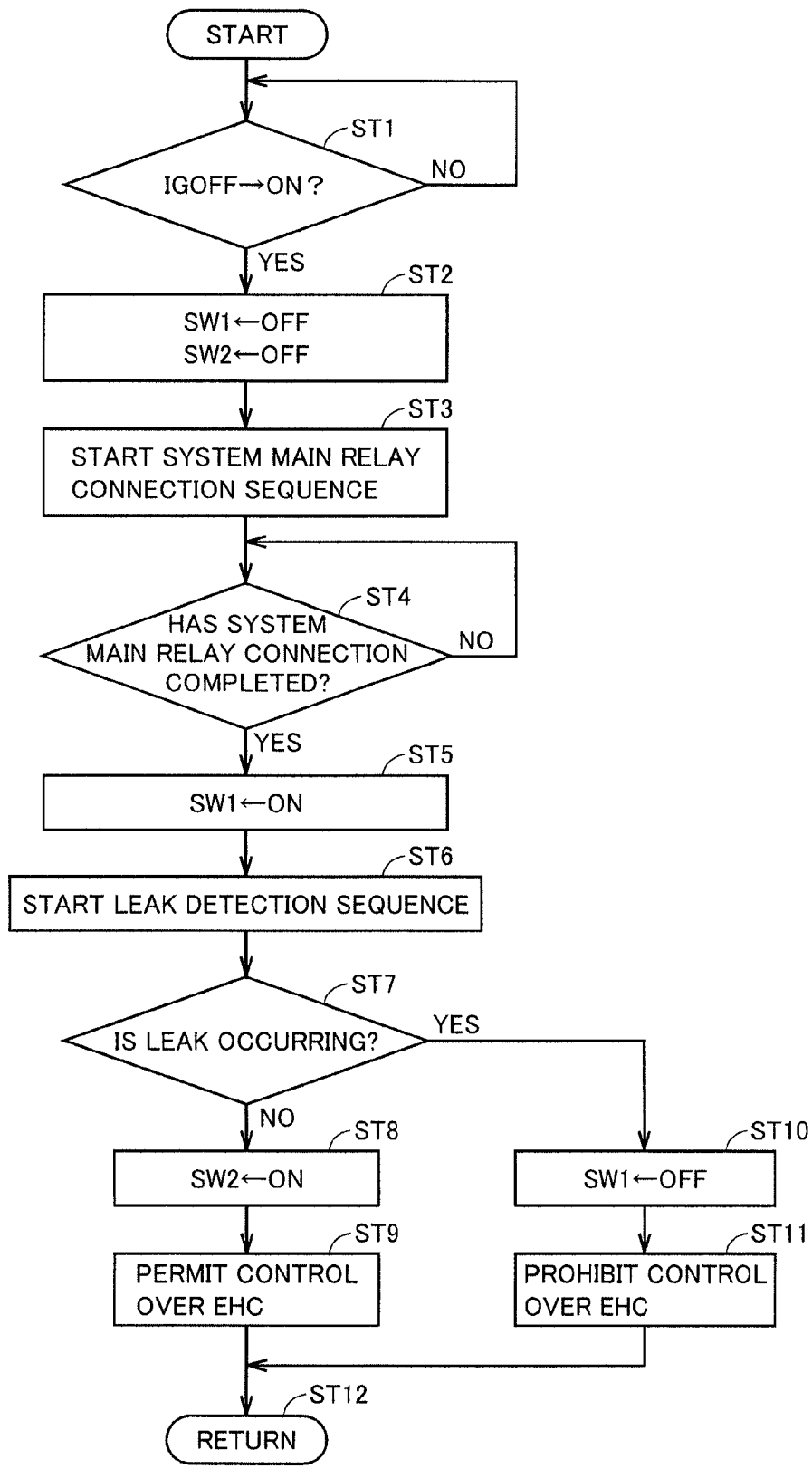
FIG. 5 is a flowchart for describing a leak detection sequence described with reference to FIG. 3.

FIG. 5 is a flowchart for describing a leak detection sequence described with reference to FIG. 3.

Referring to FIG. 5, first, when processing starts, ECU 150 in FIG. 1 detects in step ST1 whether or not a signal IG has changed from the OFF state to the ON state as a result of driver's operation of a switch for starting up the vehicle. While the change from the OFF state to the ON state is not detected, the processing in step ST1 is repeatedly performed.

If it is detected in step ST1 that signal IG has changed from the OFF state to the ON state, the processing proceeds to step ST2. In step ST2, ECU 150 controls both relay SW1 and relay SW2 in FIG. 3 to the OFF state.

Then, the processing proceeds to step ST3, and ECU 150 starts a sequence of connection of the system main relay (SMR). In this connection sequence, system main relay 72 is controlled such that connection through a limiting resistance is first made so as not to generate a spark at the time of charging capacitors C0 and C1, and after capacitors C0 and C1 are charged using power storage device 70, connection without the limiting resistance is made.

Preferably, when both relays SW1 and SW2 are open, leak detecting unit 80 may carry out leak detection in the portions other than EHC 140 during this connection sequence. For example, system main relay 72 is controlled such that GL1 is first connected to the negative electrode of power storage device 70 through the limiting resistance and the positive electrode of power storage device 70 is opened, and leak detecting unit 80 may carry out leak detection in this state. Then, when leak is not detected, the positive electrode of power storage device 70 is connected to voltage converter 90.

In step ST4, it is determined whether or not the processing of connection of system main relay 72 has completed. When charging of capacitors C0 and C1 is still insufficient in step ST4, the processing waits in step ST4. If it is determined in step ST4 that the processing of connection of system main relay 72 has completed, the processing proceeds to step ST5.

In step ST5, relay SW1 in FIG. 3 is controlled from the OFF state to the ON state. Then, in step ST6, the leak detection sequence described with reference to FIG. 4 starts.

Then, in step ST7, it is determined whether or not a result of the leak detection operation is that leak is occurring. If it is determined in step ST7 that leak is not occurring, the processing proceeds to step ST8. In step ST8, relay SW2 is also controlled from the OFF state to the ON state. Then, in step ST9, passage of current through the EHC becomes possible.

On the other hand, if it is determined in step ST7 that leak is occurring, the processing proceeds to step ST10. In step ST10, relay SW1 is controlled from the ON state to the OFF state. Then, in step ST11, passage of current through the EHC is prohibited.

Subsequently to the processing in step ST9 or step ST11, the processing proceeds to step ST12 and the control returns to the main routine. In the main routine, when leak is detected, a warning lamp and the like inform the driver of abnormality or a history of abnormality is stored.

With leak detection in accordance with the sequence as described above, leak detecting unit 80 of power storage device 70 can also be used to detect leak in the EHC without providing a special leak detecting unit in the EHC portion. As a result, an increase in cost can be avoided and the reliability of the vehicle can be increased. In addition, since leak detecting unit 80 detects leak in EHC 140 before positive electrode line PL1 is connected to EHC 140, a short circuit in positive electrode line PL1 and negative electrode line GL1 can be avoided and power storage device 70 can be protected.

It should be understood that the embodiment disclosed herein is illustrative and not limitative in any respect. The scope of the present invention is defined by the terms of the claims, rather than the description above, and is intended to include any modifications within the scope and meaning equivalent to the terms of the claims.

REFERENCE SIGNS LIST 1 hybrid vehicle; 10 engine; 40 power split device; 50 decelerator; 55 driving wheel; 60 inverter; 70 power storage device; 72 system main relay; 75 power supply unit; 80 leak detecting unit; 81 oscillation circuit; 82 detection resistance; 83 coupling capacitor; 84 bandpass filter; 85 circuit block; 86 resistance; 87 overvoltage protection diode; 88, C0, C1 capacitor; 90 voltage converter; 100 junction box; 110 control circuit; 111 oscillation commanding unit; 112 A/D converting unit; 113 determining unit; 120 current sensor; 121 voltage sensor; 122, 123, 124 rotation speed sensor; 125, 125A, 125B temperature sensor; 130 exhaust passage; 200 circuit system; 410 case; 420 insulating member; 430 EHC carrier; 450 positive electrode; 460 positive electrode coating unit; 470 negative electrode; 480 negative electrode coating unit; C1 smoothing capacitor; F1 fuse; GL0, GL1 negative electrode line; MG1, MG2 motor generator; PL0, PL1 positive electrode line; SW1, SW2 relay

The invention claimed is:

1. An exhaust purifying system for a hybrid vehicle including a power supply unit, a motor receiving electric power from said power supply unit, and an internal combustion engine used with said motor, said exhaust purifying system comprising:
    a catalytic device supplied with electric power from said power supply unit and heated;
    a first relay connecting one end of said catalytic device to a negative electrode node of said power supply unit;
    a second relay connecting the other end of said catalytic device to a positive electrode node of said power supply unit;
    a leak detecting unit detecting leak from said power supply unit; and
    a control unit controlling opening and closing of each of said first relay and said second relay, wherein
    when leak is not detected by said leak detecting unit in a leak check state where one of said first relay and said second relay is closed and the other is opened, said control unit closes said other and applies current through said catalytic device, and when leak is detected in said leak check state, said control unit does not apply the current through said catalytic device.

2. The exhaust purifying system for a hybrid vehicle according to claim 1, wherein said control unit controls said first relay and said second relay such that said first relay is closed and said second relay is opened in said leak check state.

3. The exhaust purifying system for a hybrid vehicle according to claim 1, wherein said leak detecting unit detects both leak from said power supply unit and leak from said catalytic device.

4. The exhaust purifying system for a hybrid vehicle according to claim 1, wherein
    said leak detecting unit detects leak from said power supply unit with said first relay and said second relay open, and thereafter, said first relay and said second relay are controlled such that said first relay is closed and said second relay is opened in said leak check state, and said leak detecting unit detects leak from said catalytic device.

5. A hybrid vehicle comprising the exhaust purifying system as recited in claim 1.

6. A control method for an exhaust purifying system for a hybrid vehicle including a power supply unit including a power storage device, a motor driven by said power supply unit, and an internal combustion engine used with said motor, said exhaust purifying system including:
a catalytic device supplied with electric power from said power supply unit and heated;
a first relay connecting one end of said catalytic device to a negative electrode node of said power supply unit;
a second relay connecting the other end of said catalytic device to a positive electrode node of said power supply unit;
a leak detecting unit detecting leak from said power supply unit; and
a control unit controlling opening and closing of each of said first relay and said second relay,
said control method comprising the steps of:
setting said exhaust purifying system to a leak check state where one of said first relay and said second relay is closed and the other is opened;
detecting leak by said leak detecting unit; and
controlling said first relay and said second relay to close said other and apply current through said catalytic device when leak is not detected in said step of detecting leak, and not to apply the current through said catalytic device when leak is detected.

* * * * *